United States Patent [19]

Presseau et al.

[11] 4,426,020

[45] Jan. 17, 1984

[54] CONTAINER FOR TREATING AND TRANSPORTING INDUSTRIAL WASTE SLUDGES

[76] Inventors: Marcel Presseau, 4270 Ste-Rose Blvd., Fabreville, Quebec, Canada, H7R 1X4; Marc Villeneuve, 745 Charlevoix, Boisbriand, Quebec, Canada, J7G 1W1

[21] Appl. No.: 288,416

[22] Filed: Jul. 30, 1981

[30] Foreign Application Priority Data

Dec. 30, 1980 [CA] Canada .................................. 367748

[51] Int. Cl.[3] ............................................ B65G 65/23

[52] U.S. Cl. .................................... 222/108; 222/189; 222/482; 222/564; 137/544; 137/546; 210/291

[58] Field of Search ............... 222/547, 564, 108, 166, 222/189, 482, 561, 556; 296/183, 208, 50, 61; 220/DIG. 6, 1.5; 137/544, 546; 210/241, 284, 291; 105/254

[56] References Cited

U.S. PATENT DOCUMENTS

| | | | |
|---|---|---|---|
| 1,057,328 | 3/1913 | Candy | 210/284 X |
| 1,311,639 | 7/1919 | Cartwright | 210/153 |
| 2,410,338 | 10/1946 | Craine | 137/544 |
| 2,990,036 | 6/1961 | Dubie | 222/482 |
| 3,040,925 | 6/1962 | Mills | 220/1.5 |
| 3,159,420 | 11/1963 | McCrossen | 296/183 |
| 3,357,575 | 12/1967 | Zuber et al. | 222/564 |
| 3,924,543 | 12/1975 | Mantione | 105/257 |

*Primary Examiner*—Joseph J. Rolla
*Assistant Examiner*—Thomas C. Fitzgerald
*Attorney, Agent, or Firm*—Steele, Gould & Fried

[57] ABSTRACT

A portable container for use in handling sludge. The container has a bottom wall and enclosing walls. The bottom wall has drainage areas for passing liquid from sludge placed in the container. The bottom wall is shaped to direct liquid from the sludge to the drainage areas.

6 Claims, 5 Drawing Figures

Fig. 3
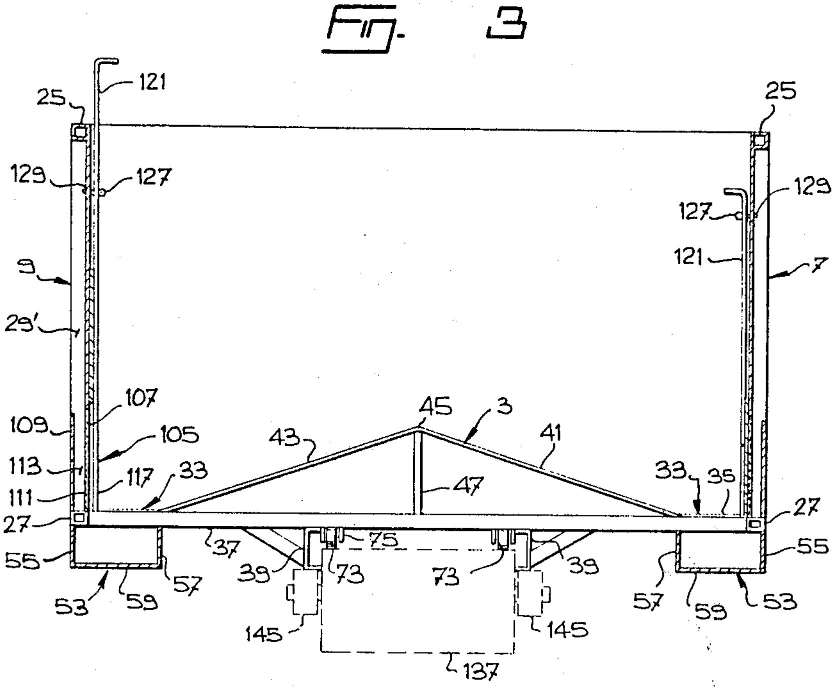
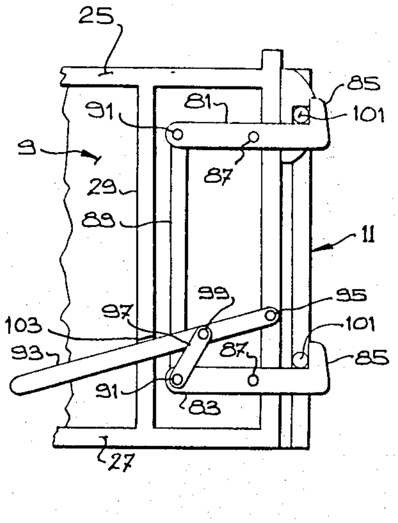
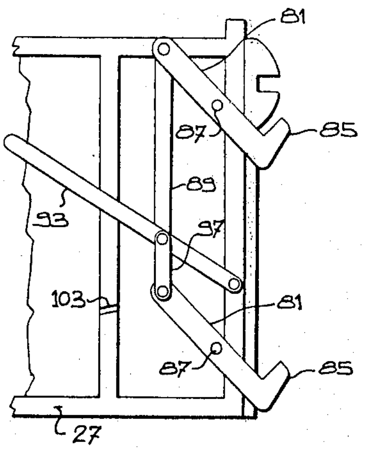
Fig. 4a
Fig. 4b

CONTAINER FOR TREATING AND TRANSPORTING INDUSTRIAL WASTE SLUDGES

BACKGROUND OF THE INVENTION

1. Field of the Invention

The present invention relates to a container for handling sludge. The invention more particularly relates to a portable container for efficiently handling sludge.

2. Description of the Prior Art

Sludge and similar material comprising a mixture of solids and liquid, must often be transported from a collection site to a disposal site. However, transportation of sludge is relatively expensive because of its high liquid content.

It is known to try to eliminate some of the liquid from the sludge prior to, or during, transportation. In one method, the sludge is dried using vacuum and/or heat equipment to remove some of the liquid. However, such equipment is expensive to use and moreover difficult to transport to, and to operate on, the premises.

It is also known to try to eliminate some of the liquid from the sludge during collection and/or transportation by placing the sludge within a container having side walls through which liquid can drain. Such an arrangement is shown in U.S. Pat. No. 1,311,639 where a dump truck box is provided with side walls through which liquid can drain. This patented arrangement has disadvantages however. Not all of the drainable liquid will have drained out of the sludge before it is time to move and dump the loaded truck. Thus, the arrangement still inefficiently transports liquids. More importantly, the container disclosed in this patent is not designed to efficiently collect and eliminate the liquid from the sludge dumped into it. The liquid that drains down to the floor of the dump box in the center of the load will take a long time to remove through the side walls.

SUMMARY OF THE INVENTION

It is the object of the present invention to provide an improved container for use in handling sludge. More particularly, it is the object of the present invention to provide an improved container which will more efficiently drain sludge of liquid.

In accordance with the present invention, this object is achieved with a container provided with draining areas in its floor or bottom wall which is shaped to direct liquid to these draining areas. With draining areas provided in the bottom wall, and with the bottom wall shaped to direct liquid to these areas, the liquid is disposed of more quickly.

The present invention therefore proposes an improved container for handling sludge, comprising a rectungular-shaped bottom wall, a front wall, a back wall, and side walls joining the front and back walls, the bottom wall being shaped to slope downwardly toward each side wall from a central ridge, and draining areas in the bottom wall adjacent each side wall for passing liquid.

The improved container according to the invention may further contain means beneath the drainage areas to collect the liquid so that it can be more easily recycled and/or disposed of. These collecting means comprise longitudinal troughs the construction of which also serves to strengthen the container.

In addition, the improved container according to the invention may also have means for minimizing blockage of the drainage areas in the bottom wall. These means can comprise drainage areas in the side walls in which areas can be selectively opened. While side wall drainage is not as effective as bottom wall drainage, the side wall drainage areas can alleviate some of the drainage problems arising from partial blockage of the bottom wall drainage areas.

The improved container according to the invention has to be portable. It must be able, for example, to be loaded onto, and transported by, a truck. Such containers are well known, but as far as is known, none have been particularly adapted to handle and transport sludge. Thus the container of the present invention can be dropped off at the collecting site and loaded with sludge. The container remains at the site until the desired amount of liquid has drained off. Then the container, with the remaining material, is loaded onto a truck and transported to a disposal site where the remaining material is dumped. It will be seen that during the drainage period, the truck is not needed at the collecting site thereby avoiding tying up expensive capital equipment.

BRIEF DESCRIPTION OF THE DRAWINGS

The invention will be better understood with reference to the following nonrestrictive description of a preferred embodiment thereof, taken in connection with the accompanying drawings in which:

FIG. 3 is a transverse cross-sectional view of the container; and

FIGS. **4*a* and 4*b*** are views of the back wall locking mechanism in the container.

DESCRIPTION OF A PREFERRED EMBODIMENT

Figure 1:
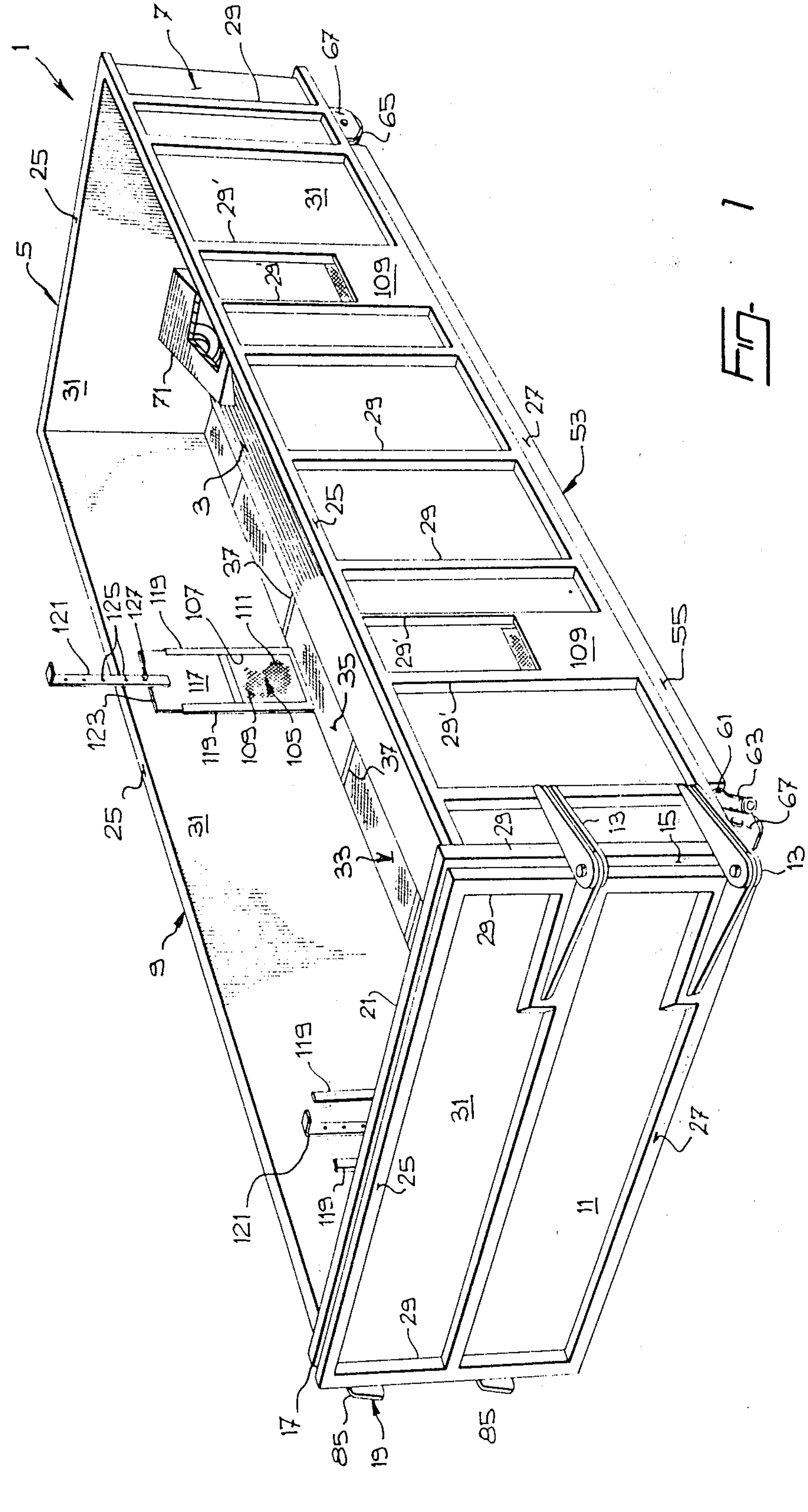
FIG. 1 is a perspective view of the container.

The portable container 1 as shown in FIGS. 1 and 3, has a bottom wall 3. The bottom wall 3 preferably is of generally rectangular shape. The container includes an enclosing wall about the bottom wall. The enclosing wall comprises a front wall 5, side walls 7 and 9 and a back wall 11. The back wall 11 preferably forms a gate for the container and is hinged at one side, with hinges 13, to the back end 15 of one of the side walls 7. The other side of the back wall 11 is detachably connected to the back end 17 of the other side wall 9 with suitable locking means 19 as will be described. A top, rear frame member 21 can extend between the top rear ends of the side walls 7, 9 to provide a rigid structure.

In more detail, each of the enclosing walls can be constructed from top and bottom, tubular frame members 25 and 27 joined at their ends, and where needed, intermediate their ends, with vertical tubular frame members 29. Plates or panels 31 are fastened to the inside of the frame members 25, 27 and 29 to complete the front, back and side walls.

The bottom wall 3 has draining areas 33 for passing liquid. A draining area 33 preferably is located adjacent each of the side walls 7 and 9 and comprises a strip of screening 35 which extends over a substantial portion of the length of the container. The screening strips 35 are supported by transverse-extending frame members 37. The transverse frame members 37 extend between the side walls 7 and 9 and are fixed to the bottom tubular frame members 27 of the side walls. The transverse frame members 37 are also mounted on, and fixed to, two longitudinal-extending main support beams 39. The support beams 39 extend the length of the container and are located in the central portion of the container.

The bottom wall 3 is shaped to direct liquid to the draining areas 33. Preferably the bottom wall has two portions 41 and 43 which slope down toward the side walls 7 and 9 respectively from a central ridge 45. The ridge 45 extends over a substantial portion the length of the bottom wall. The sloping portions 41 and 43 of the bottom wall comprise flat plates or panels joined together along one inner edge to form ridge 45. The other outer edges of the sloping wall portions 41 and 43 abut the inner edge of the screening strips 35 and are also joined to the transverse frame members 37. Vertical posts 47 extend up from the central portion of the transverse members 37 to the ridge 45 to support the sloping wall portions 41 and 43.

Means are preferably provided under each draining area 33 for collecting liquid which passes through. These means can comprise a trough 53 under each screen 35. The trough 53 has side walls 55 and 57, a bottom wall 59 extending between the side walls 55 and 57 and end walls 61 closing the ends of the trough. The outer side wall 55 of the trough is fixed to the bottom frame member 27 of the side walls 7 and 9. The inner side wall 57 is fixed to the transverse frame members 37 and also to the outer edge of the sloping wall portions 41 and 43. The collecting troughs 53 extend only under the screen strips 35 and thus terminate short of the ends of the container. Drain means 63 can be provided in one of the end walls 61 of the trough 53 as shown in FIG. 1 for removing liquid therefrom. The troughs 53, being of a channel shaped construction, and located at the bottom side edges of the container, also serve to strengthen the container.

Means are provided on the container 1 for mounting it on the ground. These means comprise support rollers 65 mounted on each side of the container 1. The rollers 65 are mounted by brackets 67 from the bottom frame members 27 adjacent each end of the troughs 53. Means are also provided at the front wall 5 of the container for attaching a cable 69 thereto. These means can comprise a bracket mounted within an enclosure 71 (see FIG. 1) projecting inwardly from the bottom, center of the front wall 5. Guide rollers 73 are also provided at the bottom, front end of the container 1. These rollers 73 are mounted on brackets 75 which project forwardly from the front end of the container.

The locking means 19 for locking the back wall 11 are mounted on the outside of side wall 9 adjacent its back end 17. The locking means 19, as shown in FIG. 4, can have parallel upper and lower latch arms 81 and 82 each having an upwardly extending hook 85 at one end. Each latch arm 81 and 83 is pivotably mounted intermidiate its ends to the side wall 9 by a pivot pin 87. The other ends of the latch arms 81 and 83 opposite hook 85, are joined by an upright link 89 pivotably mounted to the latch arms by pins 91. A handle 93 is pivotably mounted at one end by a pin 95 to the side wall 9. The handle 93 can be located just above the bottom latch arm 81 with the pivot pin 95 generally in line with the latch arm pivot pins 87. The handle 93 extends forwardly past the link 89. A short connecting link 97, is pivotably connected at one end to handle 93 by a pivot pin 99, and pivotably connected at its other end by lower pivot pin 91 to the link 89. Moving handle 93 up, will through the links 89 and 97 simultaneously lower the hooks 85 on latch arms 81 and 83 to unlock the back wall 11. The latch arms 81 and 83 normally hook over pins 101, projecting laterally from the side of the back wall 11. The handle 93 is normally retained in a locked position by a catch 103 on one of vertical frame members 29. The handle 93 is normally held under catch 103 with the back wall 11 tightly locked as shown in FIG. *4a*. To unlock the back wall 11, the handle 93 is moved sideways, then up past catch 103 to move hooks 85 shown by the parallelogram linkage system, as shown in FIG. *4b*.

The container 1 preferably is provided with draining areas 105 in its side walls 7 and 9 as well. These filter areas 105 extend up from the bottom wall 3. Preferably two such draining areas 105 are provided in each side wall 7, 9. Each side wall draining area 105 is formed by cutting out a square or rectangular opening 107 in the panel 31 of side wall 7 or 9 between two intermediate vertical frame members 29'. The opening extends up from the bottom wall 3. At the same time, the section of bottom frame member 27 between the two vertical frame members 29' is removed. A cover plate 109 is fixed between the outside of the two vertical frame members 29' and the top edge of the outer wall 55 of the trough 53. A screen 111 is mounted in the opening 107 formed in the side wall. Liquid can flow through the screen 111 into the collecting space 113 formed between the vertical frame members 29' and the cover plate 109. From collecting space 113, the liquid flows down into the trough 53 beneath it.

Preferably means are provided for opening or closing the side wall draining areas 105. These means can comprise a sliding gate 117 mounted between two vertical flanged members 119 fixed to the inside of the side walls 7 and 9 adjacent the vertical sides of the opening 107. A handle 121 extend up from the top edge 123 of the sliding gate 117 for raising or lowering it. A set of vertically spacedapart locking holes 125 are provided in the handle 121. A bolt 127, passed through one of the locking holes 125 and an aligned hole 129 in the side wall 7 or 9, can fix the gate 117 in one of several open positions.

In use, the container 1 is parked on the ground at the collecting site with its back wall closed. The container is loaded with sludge, or a similar mixture of solids and liquids. The liquids settle out of the sludge and are directed by the shaped bottom wall 3 of the container to the drainage areas 33 at the sides of the container. The liquids drain through the screens 35 into the troughs 53 and can be collected or disposed of therefrom by the drains 63. After a sufficient amount of liquid has drained out, the remaining material can be transported away for disposal by loading the container onto a vehicle 135.

Figure 2:
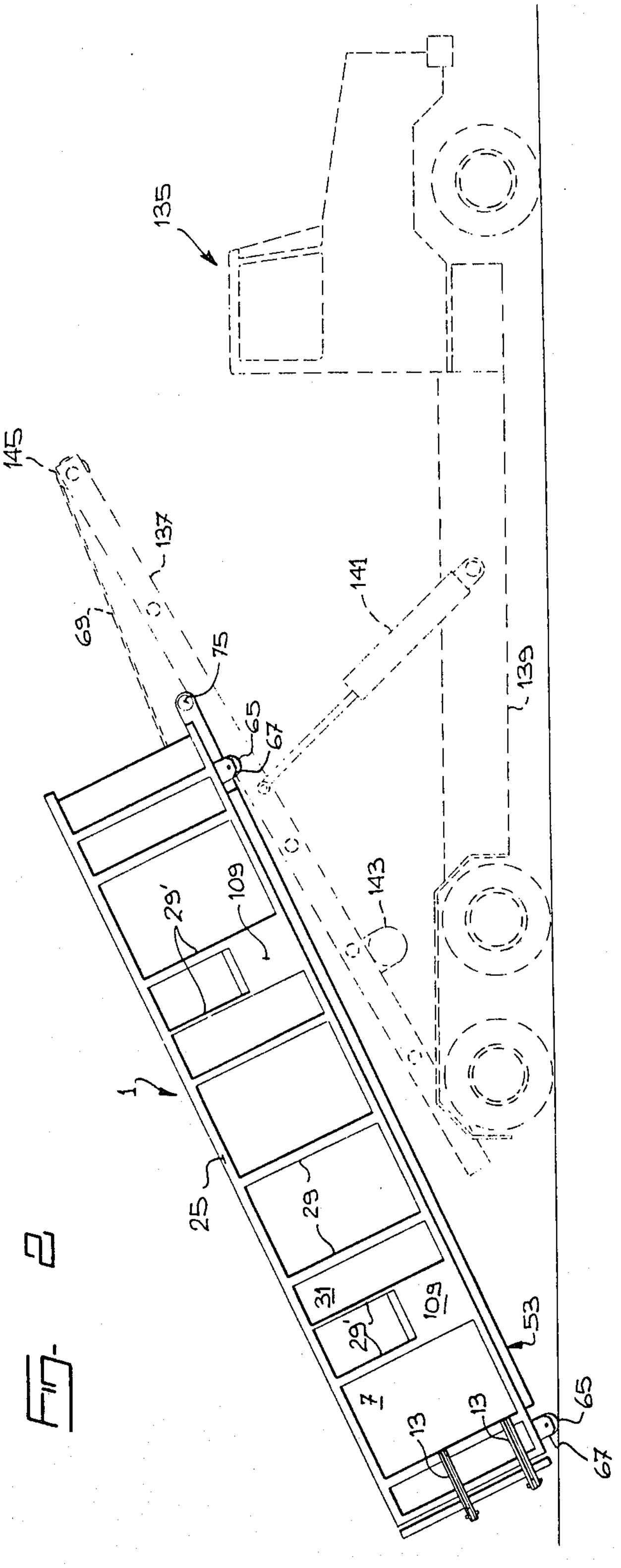
FIG. 2 is a side elevation view of the container being loaded onto a vehicle.

The vehicle 135, as shown in FIG. 2, has a platform 137 that is pivotably mounted to the rear of the vehicle chassis 139. Hydraulic means 141 are pivotably connected to the chassis 139 and to the platform 137 for raising and lowering the platform 137 as is well known. A winch 143 is mounted on the bottom of the platform 137. The cable 69 extends from the winch 143 to a pulley 145 at the front of the platform 137, over the pulley 145 and back to the rear of the platform 137. To load the container 1 onto the platform 137, the platform is raised, the cable 69 is hooked onto the container at its front wall 5 within enclosure 71, and the cable 69 is wound up by winch 143 to pull the container up onto the platform 137. The guide rollers 73 ride on top of the platform 137, as shown in FIG. 3, and the main support beams 39 ride on rollers 145 mounted on the sides of the platform 137 as shown in FIG. 3. The platform 137 is then lowered with the container 1 thereon, ready for transport to a disposal site. At the disposal site, the back wall 11 is opened and the material left in the container is dumped out with the container still mounted on the platform. The empty container is then returned and unloaded, ready for another load of sludge.

If the drainage areas 33 in the bottom wall 9 become partially clogged during draining of the sludge, the draining areas 105 in the side walls 7 and 9 can be opened up by moving the sliding gates 117 up and locking them in the open position, to provide additional drainage. After the drained material has been dumped out, the clogged drainage areas can be cleaned.

If desired, a bed of filtering material such as sand, can be used in the bottom of container to improve drainage of the sludge. The filtering material which is spreaded out on the surface of the bottom wall 3 over the drainage areas 33 on both sides of the central ridges, serves to facilitate drainage of the liquid towards the drainage areas 33 and to avoid jamming of the screens 35. The filtering material also prevents the screens 35 of the drainage areas 33 from becoming clogged in use.

What is claimed is:

1. A transportable sludge container for draining a major part of the liquid settling out of the sludge directly on the premises of a sludge collecting site, said container comprising:

an enclosing wall including a front wall, a back wall, two side walls joining the front and back walls together, and a rectangular-shaped bottom wall, said bottom wall being shaped to slope downwardly toward each of said side walls from a central, longitudinally extending ridge and including draining areas between each of said side walls and said sloping bottom wall for passing the sludge liquid directed thereto by the sloping bottom wall;

means beneath the bottom wall for detachably mounting the container onto a truck platform;

means secured to the front wall for pulling the container onto the truck platform to transport it wherever desired, said means being also useful for retaining the container on the platform during its transportation and during dumping of the sludge, and for subsequently unloading said container from said platform at the same and at other sludge collecting sites; and, means for opening and closing the back wall of the container to dump out the sludge contained therein whenever desired.

2. A transportable container as claimed in claim 1, wherein said means for opening and closing the back wall comprises hinges on one side of said back wall for mounting it to one of the side walls and locking means on the other side of said back wall for detachably connecting it to the other side wall whereby the back wall can be opened as a gate to allow dumping of the sludge from within the container.

3. A transportable container as claimed in claim 1 wherein the draining areas in the bottom wall are covered with a filtering material spread out on the surface of the bottom wall of both sides of its central ridge.

4. A transportable container as claimed in claim 1, including additional draining areas in the side walls for passing the liquid, said additional draining areas extending up from the bottom wall, and means for opening or closing said draining areas in the side walls.

5. A transportable container as claimed in claim 4, including first liquid collecting means beneath the draining areas in the bottom wall and second liquid collecting means adjacent the draining areas in the side walls, said second liquid collecting means communicating with said first liquid collecting means.

6. A transportable container as claimed in claim 5, wherein said means for opening and closing each of said draining areas in the side walls comprises a sliding door mounted between vertical guides in the side wall, said door being slidable in the guides between a first bottom position where it covers the draining area, and a second top position where it uncovers the draining area, and means for locking the door in selected positions between the top and bottom positions.

* * * * *

UNITED STATES PATENT OFFICE

CERTIFICATE OF CORRECTION

PATENT NO. : 4,426,020

DATED : January 17, 1984

INVENTOR(S) : MARCEL PRESSEAU

It is certified that error appears in the above-identified patent and that said Letters Patent are hereby corrected as shown below:

Column 3, line 52, "82" should be --83--.

Column 3, lines 54-55,"intermidiate" should be --intermediate--.

Column 4, line 37 "spacedapart" should be --spaced apart--.

Signed and Sealed this

*Nineteenth* Day of *March 1985*

[SEAL]

*Attest:*

DONALD J. QUIGG

*Attesting Officer* *Acting Commissioner of Patents and Trademarks*